United States Patent [19]

Sheem

[11] Patent Number: 4,483,582

[45] Date of Patent: Nov. 20, 1984

[54] WAVELENGTH MULTIPLEXER-DEMULTIPLEXER

[75] Inventor: Sang K. Sheem, Springfield, Va.

[73] Assignee: The United States of America as represented by the Secretary of the Navy, Washington, D.C.

[21] Appl. No.: 142,951

[22] Filed: Apr. 23, 1980

[51] Int. Cl.³ .......................... G02B 5/14; H04J 15/00
[52] U.S. Cl. .............................. 350/96.15; 350/96.12; 370/1
[58] Field of Search ............... 350/96.12, 96.13, 96.14, 350/96.15; 370/1

[56] References Cited

U.S. PATENT DOCUMENTS

| | | | |
|---|---|---|---|
| 3,920,314 | 11/1975 | Yajima | 350/96.12 |
| 3,957,341 | 5/1976 | Taylor | 350/96.15 |
| 4,142,775 | 3/1979 | Ramaswamy et al. | 350/96.14 |
| 4,153,328 | 5/1979 | Wang | 350/96.15 |
| 4,223,977 | 9/1980 | Papuchon et al. | 350/96.12 |

*Primary Examiner*—John Lee
*Attorney, Agent, or Firm*—Robert F. Beers; William T. Ellis; Alan P. Klein

[57] ABSTRACT

A multiwavelength multiplexer-demultiplexer constructed from units each capable of multiplexing or demultiplexing two wavelengths. As many such units as required can be interconnected to form multiplexer-demultiplexers of any number of wavelengths. Each two-wavelength multiplexer-demultiplexer unit includes a four-port power divider, a four-port phase shifter having two ports connected to two ports of the power divider, and another four-port power divider having two ports connected to two ports of the phase shifter. The power divider may be a single-mode optical fiber directional coupler, or a half-silvered mirror beam splitter. The phase shifter may include a pair of single mode optical fibers or a pair of oppositely disposed mirrors.

17 Claims, 19 Drawing Figures

WAVELENGTH MULTIPLEXER-DEMULTIPLEXER

BACKGROUND OF THE INVENTION

This invention relates to wavelength multiplexers and demultiplexers for communication utilizing electromagnetic waves as a carrier.

The demand for compact, simple and dependable multiplexers and demultiplexers is especially high for single-mode fiber optical communication systems. It is well known that optical communication with single-mode fibers has enormous potential in terms of communication capacity. In order to fully utilize this potential, time multiplexing and wavelength (frequency) multiplexing are necessary. Wavelength multiplexing is considered especially promising because it does not require fast switching, the speed of which may impose an ultimate limit on the full utilization of the available bandwidth in single-mode fiber communication. Conventional wavelength multiplexers are reviewed in detail by W. J. Tomlinson in Applied Optics, Vol. 16, No. 8, pp. 2180-2194, August, 1977. Conventional multiplexers/demultiplexers require an unguided collimated beam and are quite bulky.

SUMMARY OF THE INVENTION

The present invention provides a device for multiplexing and demultiplexing multiwavelength power. The device is constructed from units each of which is capable of multiplexing or demultiplexing two wavelengths. As many such units as required can be interconnected to form multiplexer-demultiplexers of any number of wavelengths. Each two-wavelength multiplexer-demultiplexer unit includes a four-port power divider, a four-port phase-shifter having two ports connected to two ports of the power divider, and another four-port power divider having two ports connected to two ports of the phase-shifter. The power divider may be a single mode optical fiber directional coupler, or a half-silvered mirror beam splitter. The phase-shifter comprises means forming two wavepaths of unequal length, each wavepath connecting a respective pair of ports of the phase-shifter, and may include a pair of single mode optical fibers or a pair of oppositely disposed mirrors. The extra path length is selected such that light of a first wavelength traveling the longer wavepath experiences a phase shift of $-\pi$ relative to light of a second wavelength traveling the same wavepath. Unlike conventional wavelength demultiplexers, the present invention may separate various wavelengths while the waves are guided by waveguides. As a result, it is not absolutely necessary to collimate waves in the process of multiplexing and demultiplexing.

Additional advantages and features will become apparent as the subject invention becomes better understood by reference to the following detailed description when considered in conjunction with the accompanying drawings wherein:

DESCRIPTION OF THE PREFERRED EMBODIMENTS

Figure 3A:
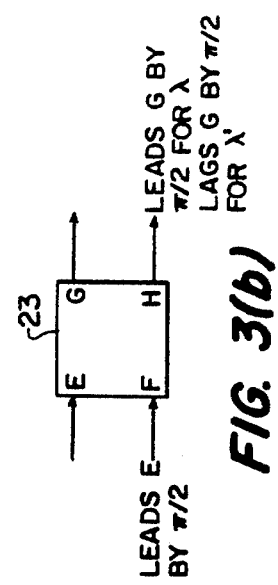
FIGS. 3 (a)–3 (b) show a four-port phase-shifter in block form.

Referring now to the drawings wherein like reference characters refer to like or corresponding parts, FIGS. 1–4 illustrate each of the essential elements of the present invention.

Figure 2A:
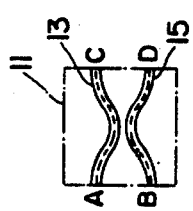
FIGS. 2 (a)–2 (c) illustrate various embodiments of the power divider of FIGS. 1(a)–1(d).
Figure 2B:
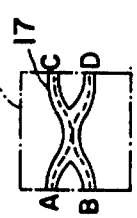
Figure 2C:
Figure 1A:
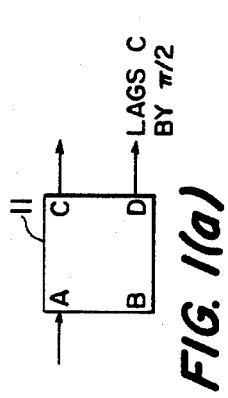
FIGS. 1 (a)–1 (d) show a four-port optical power divider in block form.
Figure 1B:
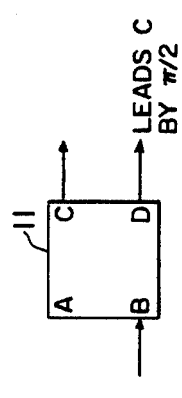
Figure 1C:
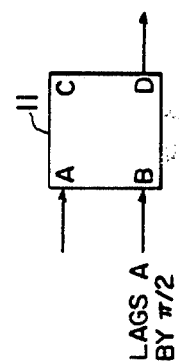
Figure 1D:
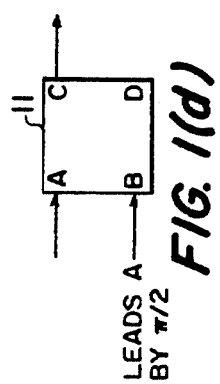

More particularly, in FIGS. 1(a)–1(d) there is shown a known four-port power divider 11 in block schematic form. The four-ports are denoted respectively by the letters A,B,C and D, and the arrows indicate the direction of power transmission. As used herein, the term "power divider" is used in the ordinary sense, that is, to denote a device in which energy applied to an input port is divided between two other ports. The power divider 11 has the property of providing two equal power outputs differing in phase by 90° (as shown in FIGS. 1(a) and 1(b)); and conversely, of coupling all the power to one of two isolated ports when power is applied equally to two other ports with a 90° phase differential (FIG. 1(c)); and of coupling all the power to the other of the two isolated ports when power is applied equally to the two other ports with a −90° phase differential (FIG. 1(d)). While a variety of such power dividers may be utilized in the practice of the subject invention, conveniently the power divider may take one of the forms illustrated in FIGS. 2 (a)–2(c) wherein the transmission paths are indicated by dotted lines. In FIG. 2(a) the power divider 11 is shown as a 3 dB directional coupler (i.e. one half of the incident power emerges from each of the two output ports) formed by disposing a pair of single mode optical fibers 13 and 15 in close proximity with one another over a defined length. The amount of light which is coupled from one fiber to the other depends on their proximity and the length over which they are coupled. The coupling can be characterized by a coupling constant k or alternatively by a characteristic coupling length 1. The 3 dB coupling condition requires that the total coupled length equal $\pi/4$ times the characteristic coupling length. In FIG. 2(b) the power divider 11 is shown as a 3 dB beam splitter formed from a branching single mode optical fiber 17. In FIG. 2(c), the power divider 11 is shown as a 3 dB beam splitter formed from a half-silvered mirror 19 which has a silver coating 21 just thick enough to transmit half of the incident light and to reflect half of the incident light.

Figure 3B:
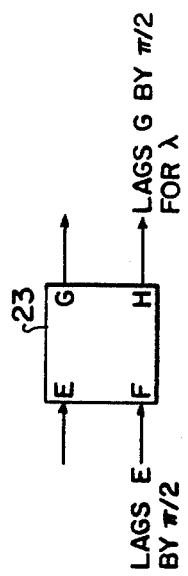
Figure 4A:
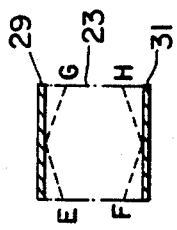
FIGS. 4 (a)–4 (b) illustrate various embodiments of the phase-shifter of FIGS. 3(a) and 3(b).
Figure 4B:
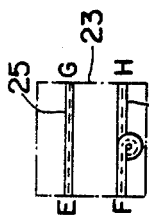

FIGS. 3(a) and 3(b) show a known four-port phase shifter 23 in block schematic form. The four-ports are denoted respectively by the letters E, F, G, and H, and the arrows indicate the direction of energy transmission. The phase shifter 23 has the property of providing two equal power outputs differing in phase by 90° for one wavelength, and of providing two equal power outputs differing in phase by −90° for another wavelength, when multiwavelength power is applied equally to two of its other ports with a 90° phase differential. While a variety of such phase shifters may be utilized in the present invention, conveniently the phase shifter may take the form of means forming two wavepaths of unequal length, each wavepath connecting a respective pair of ports of the phase shifter. FIG. 4(a) shows a first exemplary phase shifter 23 comprised of two uncoupled lengths of single mode optical fiber 25 and 27. The light path defined by fiber 27 (shown in dotted lines) is longer by a length S than the light path defined by fiber 25. FIG. 4(b) shows a second exemplary phase shifter 23 comprised of a pair of oppositely disposed plane mirrors 29 and 31. The mirrors are positioned so that the light path defined by mirror 31 (shown in dotted lines) is longer by a length S than the light path defined by mirror 29. In both examples, the extra length S is selected such that light of the first wavelength $\lambda'$ traveling the longer wavepath experiences a phase shift of $-180°$ over the extra path length S relative to light of the second wavelength $\lambda$ traveling the same wavepath. This condition can be expressed as $$[B(\lambda') - B(\lambda)]S = -\pi, \quad (1)$$

where $B(\lambda_o)$ is the propagation constant (the phase change in the wave per unit distance traveled) for light of wavelength $\lambda_o$ traveling in a medium whose effective index of refraction is $n(\lambda_o)$. Obviously, since the phase shift in the wave per wavelength traveled in the medium $$\frac{\lambda_o}{n(\lambda_o)} \text{ is } 2\pi, B(\lambda_o) = 2\pi \frac{n(\lambda_o)}{\lambda_o}$$

and the condition can be rewritten $$2\pi \left[ \frac{n(\lambda')}{\lambda'} - \frac{n(\lambda)}{\lambda} \right] S = -\pi \quad (2)$$

The path difference S to resolve two wavelengths $\Delta\lambda$ apart, i.e. to shift the phase of one wavelength by $-180°$ relative to the phase of the other, is given by substituting $\lambda' = \lambda + \Delta\lambda$ in equation (2). If $\Delta\lambda$ is much smaller than $\lambda$, $n(\lambda') = n(\lambda)$ for the optical media of interest, and equation (2) reduces to:

$$S = \lambda^2 / 2n\Delta\lambda. \quad (3)$$

Figure 5:
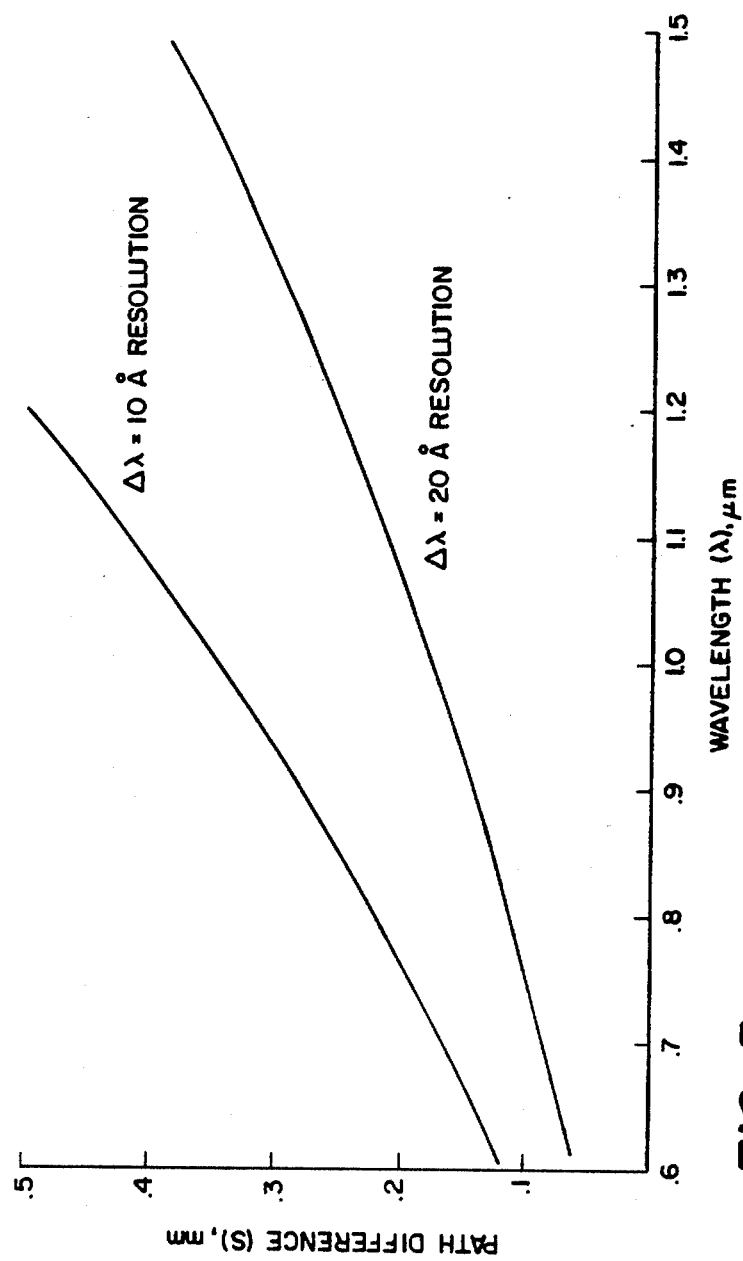
FIG. 5 is a plot of $S = \lambda^2/2n\Delta\lambda$ for different values of $\Delta\lambda$.

Equation (3) is plotted in FIG. 5 for a typical optical fiber for which n = 1.5.

FIGS. 6(a)-6(d) show a first embodiment of the invention which comprises two power dividers 11 and a phase-shifter 23 as discussed above. Two ports of each power divider 11 are respectively connected to one of the four-ports of the phase-shifter 23 to form a two-wavelength multiplexer-demultiplexer.

Figure 6A:
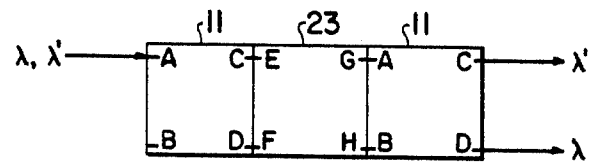
FIGS. 6 (a)–6 (d) show a first embodiment of the wavelength multiplexer-demultiplexer of the invention.
Figure 6B:
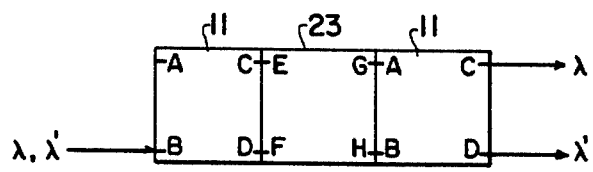

FIGS. 6(a) and 6(b) illustrate the use of the device to demultiplex optical power of two wavelengths $\lambda$ and $\lambda'$. In operation, multiwavelength power at wavelengths $\lambda$ and $\lambda'$ is applied to one input port of the first power divider 11 (port A in FIG. 6(a) or port B in FIG. 6(b)). Power divider 11 provides two equal multiwavelength power outputs differing in phase at the two ports E and F of the adjacent phase shifter 23 (F lags E by 90° in FIG. 6(a); F leads E by 90° in FIG. 6(b)). The phase shifter 23 then applies multiwavelength power equally to the two ports A and B of the second power divider 11 after producing a further wavelength dependent phase shift (B lags A by 90° for $\lambda$ and B leads A by 90° for $\lambda'$ in FIG. 6(a); whereas B lags A by 90° for $\lambda'$ and B leads A by 90° for $\lambda$ in FIG. 6(b). The second power divider 11 then couples all of the power at the former wavelength to one isolated output port D, and couples all of the power at the latter wavelength to the other output port C.

Figure 6C:
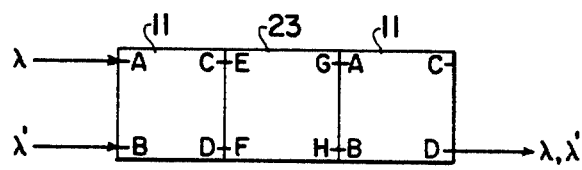
Figure 6D:
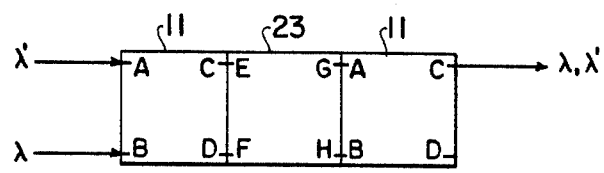

FIGS. 6(c) and 6(d) illustrate the use of the device to multiplex optical power of two wavelengths $\lambda$ and $\lambda'$. In operation, power at a first wavelength is applied to one input port of the first power divider 11 (port A in FIG. 6(c) or port B in FIG. 6(d)), and equal power at a second wavelength $\lambda'$ is applied to the other input port of the first power divider (port B in FIG. 6(c) or port A in FIG. 6(d)). Power divider 11 provides two equal multiwavelength power outputs having a wavelength-dependent phase difference at the ports E and F of the adjacent phase shifter 23 (F lags E by 90° for $\lambda$ and F leads E by 90° for $\lambda'$ in FIG. 6(c); whereas F lags E by 90° for $\lambda'$ and F leads E by 90° for $\lambda$ in FIG. 6(d)). The phase shifter 23 then applies power equally to the two ports A and B of the second power divider 11 after producing a further wavelength dependent phase shift (B lags A by 90° for both $\lambda$ and $\lambda'$ in FIG. 6(c); whereas B leads A by 90° for both $\lambda$ and $\lambda'$ in FIG. 6(d)). The second power divider 11 then couples all of the multiwavelength power to one isolated port (port D in FIG. 6(c) or port C in FIG. 6(d)).

Figure 7:
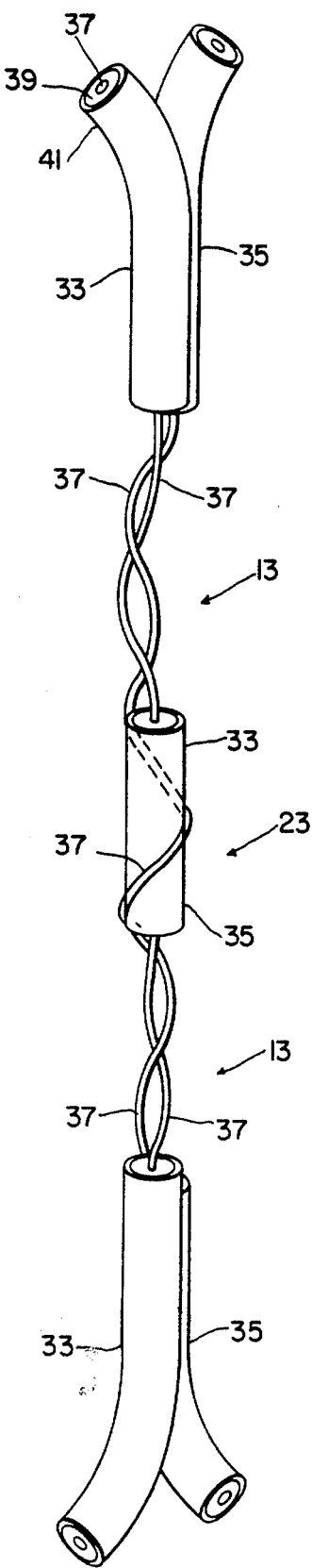
FIG. 7 shows a second embodiment of the wavelength multiplexer-demultiplexer of the invention.

FIG. 7 illustrates a practical embodiment of the two-wavelength multiplexer-demultiplexer of the invention fabricated from two single mode optical fibers 33 and 35. Each fiber includes, as major components, a central core 37, a cladding 39 of lesser index of refraction than that of the core 37, and a protective jacket 41, typically of plastic. The fibers are stripped down to the cores 37 at the two ends of the device and the latter are twisted about one another to form the two directional couplers 13. Only one of the fibers 33 is stripped in the middle of the device and the latter's core 37 is wrapped around the unstripped middle portion of the other fiber 35 to form the two uncoupled and unequal lengths of fiber of the phase shifter 23.

Figure 8A:
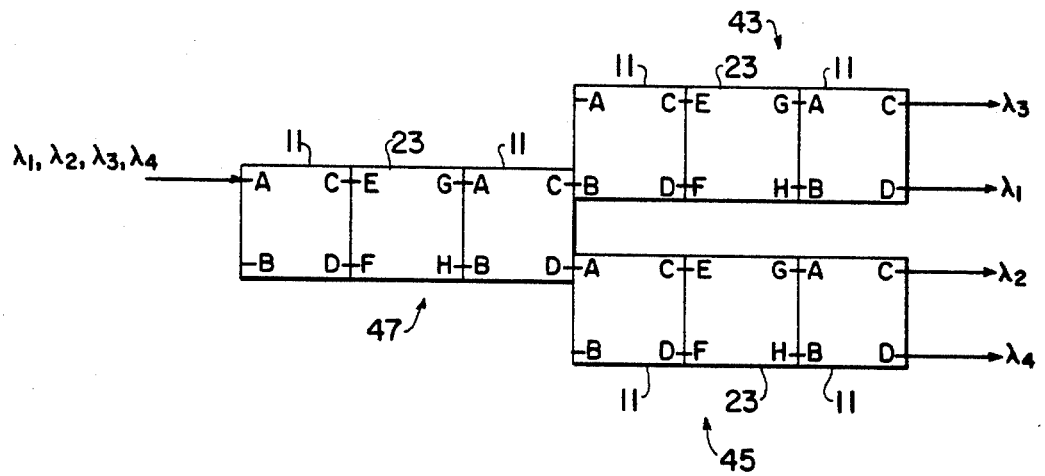
FIGS. 8 (a)–8 (b) show a third embodiment of the multiplexer-demultiplexer of the invention.
Figure 8B:
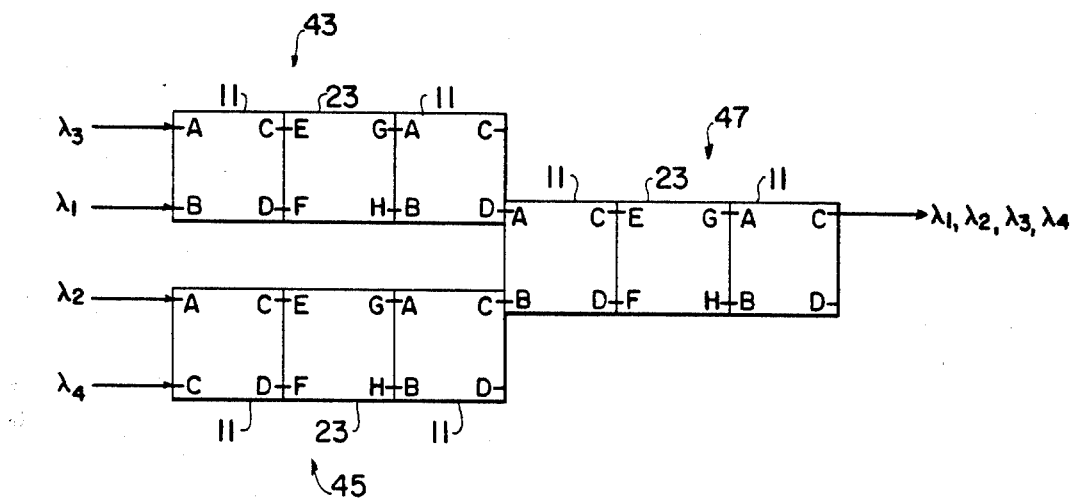

A multiplexer-demultiplexer of four wavelengths can be realized, as shown in FIGS. 8(a) and 8(b) by connecting one of the ports of one power divider 11 of each one of a pair of two-wavelength multiplexer-demultiplexers 43 and 45 to a respective port of one power divider 11 of another two-wavelength multiplexer-demultiplexer 47. The extra length S of the phase shifter 23 of each two-wavelength multiplexer-demultiplexer 43, 45 or 47 is determined from equation (2) or (3). Thus, for example in the embodiment of FIG. 8(a) and 8(b), if it is assumed that four equally spaced wavelengths $\lambda$, $\lambda + \frac{1}{2}\Delta\lambda$, $\lambda + \Delta\lambda$ and $\lambda + 3/2\Delta\lambda$, are to be multiplexed or demultiplexed, the extra path length for the main unit 47 is $\lambda^2/n\Delta\lambda$, while that for the two arms 43 and 45 is $\lambda^2/2n\Delta\lambda$. In operation as a demultiplexer (FIG. 8(a)), main unit 47 transmits light of wavelengths $\lambda + \frac{1}{2}\Delta\lambda$ and $\lambda + 3/2\Delta\lambda$ to one arm 43 and light of wavelengths $\lambda + \frac{1}{2}\Delta\lambda$ and $\lambda + 3/2\Delta\lambda$ to the other arm 45. Each arm provides an output for each of its two wavelengths. In operation as a multiplexer (FIG. 8(b)), one arm 43 transmits light of wavelengths $\lambda$ and $\lambda + \Delta\lambda$ to the main unit 47 and the other arm transmits light of wavelengths $\lambda + \frac{1}{2}\Delta\lambda$ and $\lambda + 3/2\Delta\lambda$ to the main unit 47. The latter provides a single output containing the four wavelengths. It will be readily appreciated that as many two-wavelength multiplexer-demultiplexers as required can be connected to form wavelength multiplexer-demultiplexers of any number of wavelengths.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A wavelength multiplexer-demultiplexer comprising:
   a first pair of single-mode optical fibers disposed in close proximity with one another over a defined length to form a first four-port optical power divider;
   a second pair of single-mode optical fibers disposed in close proximity with one another over a defined length to form a second four-port optical power divider;
   each power divider having the property of providing two equal power outputs differing in phase by 90° and conversely, of coupling all the power to one of two isolated ports when power is applied equally to two other ports with a 90° phase differential, and of coupling all the power to the other of the two isolated ports when power is applied equally to the two other ports with a −90° phase differential; and
   a four-port phase shifter having the property of providing two equal power outputs differing in phase by 90° for one wavelength, and of providing two equal power outputs differing in phase by −90° for another wavelength, when power is applied equally to two other ports thereof with a 90° phase differential,
   two of the ports of the first power divider and two of the ports of the second power divider being respectively connected to the four-ports of the phase shifter.

2. The wavelength multipler-demultiplexer recited in claim 1 wherein the four-port phase shifter includes:
   means for forming two wavepaths of unequal length, each wavepath connecting a respective pair of ports of the phase shifter.

3. The wavelength multiplexer-demultiplexer recited in claim 2 wherein the wavepath-forming means includes:
   a pair of single-mode optical fibers.

4. A wavelength multiplexer-demultiplexer comprising:
   a first branching single-mode optical fiber forming a first four-port optical power divider;
   a second branching single-mode optical fiber forming a second four-port optical power divider,
   each power divider having the property of providing two equal power outputs differing in phase by 90° and conversely, of coupling all the power to one of two isolated ports when power is applied equally to two other ports with a 90° phase differential, and of coupling all the power to the other of the two isolated ports when power is applied equally to the two other ports with a −90° phase differential; and
   a four-port phase shifter having the property of providing two equal power outputs differing in phase by 90° for one wavelength, and of providing two equal power outputs differing in phase by −90° for another wavelength, when power is applied equally to two other ports thereof with a 90° phase differential,
   two of the ports of the first power divider and two of the ports of the second power divider being respectively connected to the four-ports of the phase shifter.

5. The wavelength multiplexer-demultiplexer recited in claim 4 wherein the four-port phase shifter includes:
   means for forming two wavepaths of unequal length, each wavepath connecting a respective one of the ports of the first power divider to a respective one of the ports of the second power divider.

6. The wavelength multiplexer-demultiplexer recited in claim 5 wherein the wavepath-forming means includes:
   a pair of single-mode optical fibers.

7. A wavelength multiplexer-demultiplexer comprising:
   three two-wavelength multiplexer-demultiplexers, each two-wavelength multiplexer-demultiplexer including a pair of four-port power dividers and a four-port phase shifter, two of the ports of one power divider and two of the ports of the other power divider being respectively connected to the four-ports of the phase shifter,
   one of the ports of one power divider of one of the two-wavelength multiplexer-demultiplexers and one of the ports of one power divider of another two-wavelength multiplexer-demultiplexer being connected to respective ports of one power divider of a third two-wavelength multiplexer-demultiplexer,
   each power divider having the property of providing two equal power outputs differing in phase by 90° and conversely, of coupling all the power to one of two isolated ports when power is applied equally to two other ports with a 90° phase differential, and of coupling all the power to the other of the two isolated ports when power is applied equally to the two other ports with a −90° phase differential; and
   each phase shifter having the property of providing two equal power outputs differing in phase by 90° for one wavelength, and of providing two equal power outputs differing in phase by −90° for another wavelength, when power is applied equally to two other ports thereof with a 90° phase differential.

8. The wavelength multiplexer-demultiplexer recited in claim 7 wherein each four-port phase shifter includes:
   means for forming two wavepaths of unequal length, each wavepath connecting a respective pair of ports of the phase shifter.

9. The wavelength multiplexer-demultiplexer recited in claim 8 wherein each wavepath forming means includes:
   a pair of single-mode optical fibers.

10. The wavelength multiplexer-demultiplexer recited in claim 8 wherein each wavepath forming means includes:
    a pair of oppositely disposed plane mirrors.

11. The wavelength multiplexer-demultiplexer recited in claim 7 wherein each four-port power divider includes:
    a directional coupler.

12. The wavelength multiplexer-demultiplexer recited in claim 11 wherein each directional coupler includes:

a pair of single-mode optical fibers disposed in close proximity with one another over a defined length.

13. The wavelength multiplexer-demultiplexer recited in claim 7 wherein each four-port power divider includes:
a beam splitter.

14. The wavelength multiplexer-demultiplexer recited in claim 13 wherein each beam splitter includes:
a branching single-mode optical fiber.

15. The wavelength multiplexer-demultiplexer recited in claim 13 wherein each beam splitter includes:
a half-silvered mirror.

16. A method of demultiplexing wavelengths comprising the steps of:
dividing one multiwavelength power beam into two equal multiwavelength power beams;
shifting the phases of the different wavelength components of each of the two equal multiwavelength power beams; and
coupling all of the power at each wavelength to a separate isolated output port in the forward direction.

17. A method of multiplexing wavelengths comprising the steps of:
coupling single wavelength power beams, each single wavelength beam having a different wavelength into two equal multiwavelength power beams;
shifting the phases of the different wavelength components of each multiwavelength power beam; and
combining the two equal multiwavelength power beams into one multiwavelength power beam.

* * * * *